United States Patent
McCarroll

[11] 3,993,281
[45] Nov. 23, 1976

[54] SAFETY SIDE MIRROR FOR VEHICLES

[76] Inventor: Raymond A. McCarroll, 1725 Newcastle, Grosse Pointe Woods, Mich.

[22] Filed: Aug. 29, 1975

[21] Appl. No.: 608,928

[52] U.S. Cl. ............................................. 248/481
[51] Int. Cl.² ....................................... A47G 1/24
[58] Field of Search ............ 248/475 A, 475 B, 479, 248/481, 482, 483, 484

[56] References Cited
UNITED STATES PATENTS

| 2,150,173 | 3/1939 | Hodny | 248/481 |
| 2,565,012 | 8/1951 | Barrett | 248/475 B |
| 2,643,847 | 6/1953 | McDevitt | 248/484 |
| 2,845,000 | 7/1958 | Morley | 248/481 |
| 3,603,555 | 9/1971 | Lohr | 248/481 |

FOREIGN PATENTS OR APPLICATIONS

| 2,061,890 | 7/1971 | Germany | 248/481 |
| 298,357 | 10/1928 | United Kingdom | 248/481 |
| 998,396 | 7/1965 | United Kingdom | 248/484 |

*Primary Examiner*—Robert A. Hafer
*Attorney, Agent, or Firm*—Olsen and Stephenson

[57] ABSTRACT

A rearview mirror for mounting on the side of a motor vehicle and constructed and arranged so that it will swing away when contacted by any obstacle whether moving in a forward or reverse direction. The mirror includes a mounting bracket for attachment to a laterally recessed portion of the vehicle adjacent to the door glass, a ball socket in the bracket and a swivel ball shaft retained in the ball socket and connected to the lower inboard corner of the mirror housing so that substantially all components will be capable of swinging movement if engaging any obstacle.

6 Claims, 4 Drawing Figures

U.S. Patent  Nov. 23, 1976  3,993,281
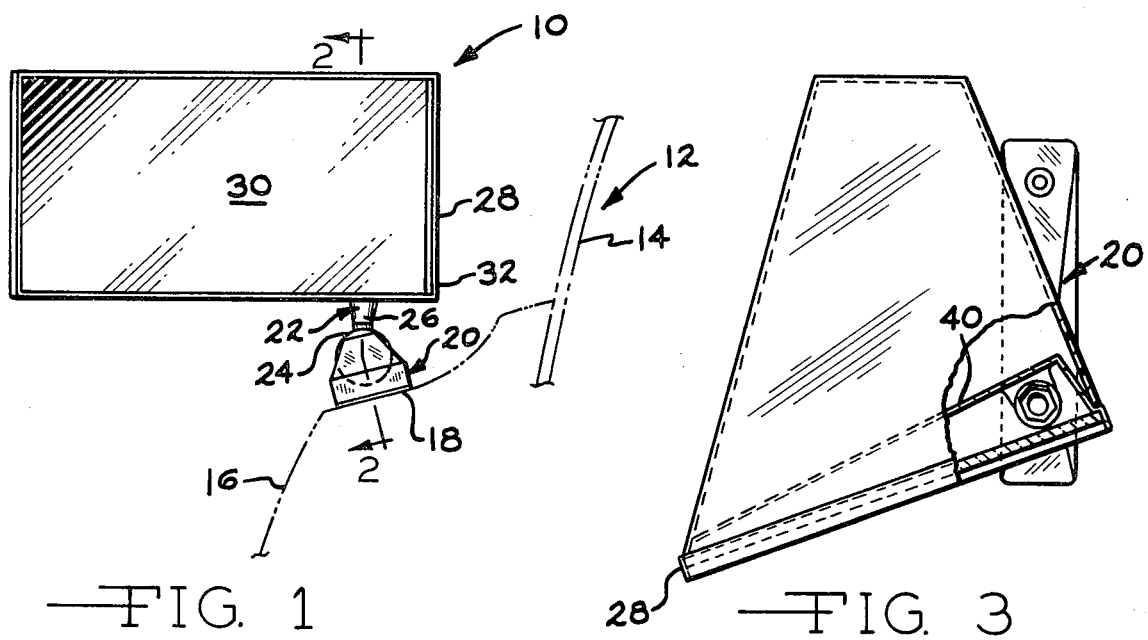
FIG. 1
FIG. 3
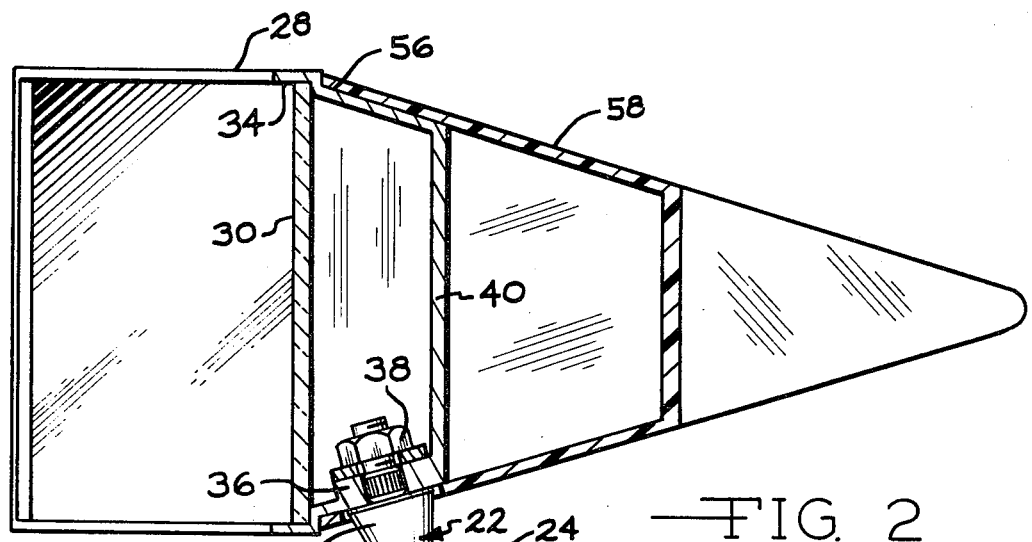
FIG. 2
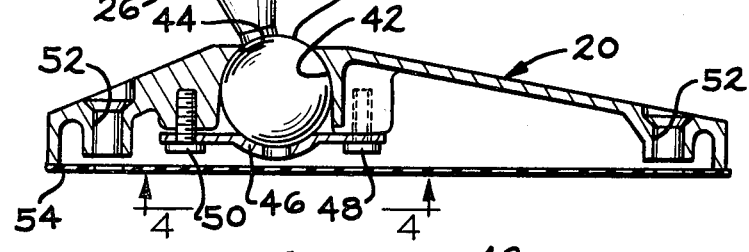
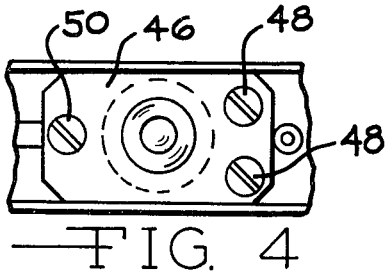
FIG. 4

SAFETY SIDE MIRROR FOR VEHICLES

BACKGROUND OF THE INVENTION

The present invention relates to rearview mirrors for motor vehicles and particularly to such mirrors that are mounted on the outer sides of the motor vehicles.

As a general rule, past and current designs of side rearview mirrors have solid door mounting brackets which are not only relatively costly, but are a potential hazard in that they may strike persons or objects while the vehicle is moving in either forward or reverse directions. Further, these prior art mirrors have been styled in such a way that manufacturing and installation costs as well as their weights have been excessive.

SUMMARY OF THE INVENTION

The present invention has overcome the inadequacies of the prior art and provides an improved rearview mirror that is characterized by its relatively light weight and low cost, and its safety features which materially reduce the potential of the mirror to become a safety hazard. Further, the construction of the mirror reduces the potential for damage to the mirror if it strikes an obstruction when the vehicle on which it is mounted is moving either in a forward or reverse direction. The improved rearview mirror is also constructed and arranged so that it can readily be restyled for use on sports vehicles and the like without significantly altering the improved safety features embodied therein.

According to one form of the present invention a rearview mirror is provided for use in combination with a motor vehicle that has a side panel profile that converges inwardly from the lateral extremities thereof to provide a mounting portion. The sideview mirror comprises a mounting bracket secured to the mounting portion, a swivel ball shaft with the ball portion retained in the mounting bracket and the shaft portion extending upward from said mounting bracket, a mirror housing secured to the upper end of the shaft portion, and a mirror glass mounted in the mirror housing to provide a rearview to an occupant of the motor vehicle. The mirror housing and the swivel ball shaft are swivelly mounted relative to the mounting bracket so that if an obstruction engages the mirror housing, the mirror housing can be deflected or swiveled inwardly of the lateral extremities of the side panel profile. In this construction the swivel ball shaft is mounted in the mounting bracket for 360° rotation about a vertical axis. The swivel ball shaft is connected to the mirror housing at the lower inboard corner thereof to facilitate the deflection of the mirror housing inward from the outer extremities of the side panel of the motor vehicle.

An attachment can readily be added to the mirror housing to convert the sideview mirror to a sports model, and this can be accomplished without materially altering the safety and improved cost factors discussed above. For this purpose the mirror housing has a recessed portion on which a nose cone of flexible plastic material can be mounted to provide a desired configuration, color and flexible features to the forwardly projecting nose cone. Thus, it is an object of the present invention to provide an improved sideview mirror for use in conjunction with a motor vehicle.

Other objects of this invention will appear in the following description and appended claims, reference being had to the accompanying drawing for forming a part of this specification wherein like reference characters designate corresponding parts in the several views.

BRIEF DESCRIPTION OF THE DRAWING

FIG. 1 is a rear elevational view of a rearview mirror embodying the present invention, showing the sideview mirror mounted on a motor vehicle which is shown fragmentarily in broken lines;

FIG. 2 is an enlarged section of the sideview mirror taken on the lines 2—2 of FIG. 1;

FIG. 3 is a top plan view partly in section of the rearview mirror; and

FIG. 4 is a fragmentary bottom plan view of the resilient retainer plate for the ball portion of the mirror mounting means, viewed in the direction of the lines 4—4 of FIG. 2.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The sideview mirror 10 is shown mounted on a motor vehicle 12 that has a door glass 14 and a side panel 16. The latter is constructed and arranged so that it provides a mounting portion 18 located laterally inwardly of the outer extremity of the side panel 16.

The sideview mirror 10 includes a mounting bracket 20 secured to the mounting portion 18, a swivel ball shaft 22 with the ball portion 24 retained in the mounting bracket 20 and the shaft portion 26 extending upward from the mounting bracket 20. A mirror housing 28 is secured to the upper end of the shaft portion 26, and a mirror glass 30 is mounted in the mirror housing 28 to provide a rear view to an occupant of the motor vehicle 12. The mirror housing 28 and the swivel ball shaft 22 are swivelly movable relative to the mounting bracket 20 so that if an obstruction engages the mirror housing 28, the latter can be deflected or swiveled inwardly of the lateral extremities of the side panel 16, thereby in most instances preventing injury to either the obstruction or the rearview mirror.

Referring particularly to FIG. 1, it will be observed that the swivel ball shaft 22 is connected to the mirror housing 28 at the lower inboard corner 32 thereof, and the swivel ball shaft 22 is mounted in the mounting bracket 20 for 360° rotation about a vertical axis through the ball portion 24. By virtue of this construction and arrangement, if an obstruction engages the housing 28 at the outer extremities thereof, the mirror housing 28 can readily be deflected or swiveled laterally inwardly so that the sideview mirror will not be damaged and also so that the potential damage to an individual or an obstacle that is struck by the mirror housing will be substantially reduced or completely eliminated.

In the preferred embodiment of the invention the mirror housing 28 has a rearwardly opening peripheral recess 34 in which the mirror glass 30 is mounted, and a lug 36 is provided immediately forward of the recessed 34 through which said swivel ball shaft 22 is secured by means of the jam nut 38. A forward wall 40 is provided which extends upward immediately forward of the lug 36 to provide with the mirror glass 30 a relatively small compartment in a fore and aft direction for housing the jam nut 38 and so as to permit relatively free and unobstructed swivel movement of the rearview mirror with respect to the side panel of the motor vehicle. It can be seen particularly with reference to FIG. 3, that the relatively narrow compartment in a fore and aft direction will allow the mirror housing 28 to be pivoted about the vertical axis of the ball portion 24 without engaging the side panel 16 or window glass 14 until the mirror housing has been deflected entirely inward out of alignment of the path of the obstruction that may have been engaged.

The mounting bracket 20 includes an internal socket 42 in which the ball portion 24 is seated. The internal socket 42 includes an aperture 44 in the base of the socket 42 through which the shaft portion 26 extends. The ball portion 24 is retained in place in the internal socket 42 by a resilient retainer plate 46 which has spring properties and engages the ball portion 24 and resiliently secures it in place by action of the two forward screws 48 and the spring tensioning screw 50.

For mounting the mounting bracket 20 on the side panel 16 of the motor vehicle, a plurality of screw openings 52 are provided, and a mounting gasket 54 may also be used.

To permit the present invention to be used in connection with motor vehicles of the sports model type, the mirror housing 28 has a recessed portion 56 around its outer periphery facing in a forward direction, and a nose cone 58 of suitable plastic material, such as polyurethane, may be mounted thereon as is illustrated in the drawing. It is to be understood that the nose cone 58 is an optional accessory which is made of a suitable plastic material so that it will readily collapse in the event that the mirror housing 28 engages any obstacle that will cause pivoting of the mirror housing to occur. By virtue of the flexible characteristics of the nose cone 58, the pivoting movement of the mirror housing 28 will not be significantly impeded.

The present invention is not limited to the specific use of any type of material, but prefereably, the mirror housing 28 will be formed from a suitable zinc chrome plate structure, and the nose cone 58 will be a suitable plastic material such as polyurethane that can be colored so as to be compatable with the color of the motor vehicle on which the rearview mirror is mounted.

It is claimed:

1. In combination with a motor vehicle having a side panel profile that converges inwardly from the lateral extremities thereof to provide a mounting portion, a sideview mirror comprising a mounting bracket secured to said mounting portion, a swivel ball shaft with the ball portion retained in said mounting bracket and the shaft portion extending upward from said mounting bracket, a mirror housing secured to the upper end of said shaft portion, and a mirror glass mounted in said mirror housing to provide a rear view to an occupant of said motor vehicle, said mirror housing and the swivel ball shaft being swivelly movable relative to said mounting bracket so that if any obstruction engages the mirror housing, the mirror housing can be deflected inward of the lateral extremities of said side panel profile, said mirror housing having a rearwardly opening peripheral recess in which said mirror glass is mounted, a lug located immediately forward of said recess to which said swivel ball shaft is secured by a jam nut, and a forward wall extending upward immediately forward of said lug to provide with said mirror glass a relatively small compartment in a fore and aft direction for housing said jam nut and so as to permit relatively free movement of the rearview mirror with respect to the side panel of the motor vehicle, said mirror housing having a recessed portion around its outer periphery facing in a forward direction, and a nose cone of flexible plastics material mounted on said recessed portion and projecting forward of the mirror housing, said nose cone having a fore-and-aft dimension substantially greater than the corresponding dimension of said housing.

2. In combination with a motor vehicle having a side panel profile that converges inwardly from the lateral extremities thereof to provide a mounting protion, a sideview mirror comprising a mounting bracket secured to said mounting portion, a swivel ball shaft with the ball portion retained in said mounting bracket and the shaft portion extending upward from said mounting bracket, a mirror housing secured to the upper end of said shaft portion, and a mirror glass mounted in said mirror housing to provide a rear view to an occupant of said motor vehicle, said mirror housing and the swivel ball shaft being swivelly movable relative to said mounting bracket so that if any obstruction engages the mirror housing, the mirror housing can be deflected inward of the lateral extremities of said side panel profile, said mirror housing having a rearwardly opening peripheral recess in which said mirror glass is mounted, a lug located immediately forward of said recess to which said swivel ball shaft is secured by a jam nut, a forward wall extending upward immediately forward of said lug, and walls extending from said peripheral recess to said forward wall to provide with said mirror glass a relatively small completely enclosed compartment in a fore and aft direction for housing said jam nut, and said ball portion protruding upward out of said mounting bracket to avoid restricting the lateral movement of said shaft portion by said mounting bracket so as to permit relatively free movement of the rearview mirror with respect to the side panel of the motor vehicle.

3. The combination that is defined in claim 2, wherein said swivel ball shaft is mounted in said mounting bracket for 360° rotation about a vertical axis.

4. The combination that is defined in claim 3, wherein said swivel ball shaft is connected to said mirror housing at the lower inboard corner thereof.

5. The combination that is defined in claim 2, wherein said mirror housing has a recessed portion around its outer periphery facing in a forward direction, and a nose cone of plastic material is mounted on said recessed portion.

6. The combination that is defined in claim 2, wherein said mounting bracket includes an internal socket in which said ball portion is seated, said internal socket having an aperture in the base through which said shaft portion extends, said ball portion being retained in place by a resilient retainer plate engaging the ball portion and secured to said mounting bracket.

\* \* \* \* \*